United States Patent [19]

Senda et al.

[11] 4,376,656
[45] Mar. 15, 1983

[54] HEAT RESISTANT YELLOW IRON OXIDE PIGMENT

[75] Inventors: Jihei Senda; Yoshihiro Inoue; Toshiaki Uenishi, all of Ube; Hidefumi Harada, Yamaguchi; Kouji Nakata, Ube; Akio Akagi, Ube; Yakanori Yamasaki, Ube, all of Japan

[73] Assignee: Titan Kogyo K.K., Japan

[21] Appl. No.: 311,847

[22] Filed: Oct. 16, 1981

Related U.S. Application Data

[63] Continuation-in-part of Ser. No. 154,270, May 29, 1980, abandoned.

[30] Foreign Application Priority Data

May 30, 1979 [JP] Japan .................................. 54-66102

[51] Int. Cl.³ .......................... C01G 49/02; C09C 1/24
[52] U.S. Cl. .................................. 106/309; 106/304; 106/308 B; 423/633; 427/218
[58] Field of Search .................... 106/304, 308 B, 309; 423/633; 427/218

[56] References Cited

U.S. PATENT DOCUMENTS

| | | | |
|---|---|---|---|
| 3,382,174 | 5/1968 | Hund | 423/634 |
| 3,919,404 | 11/1975 | Beck | 423/633 |
| 3,946,103 | 3/1976 | Hund | 106/304 |
| 3,969,494 | 7/1976 | Nobuoka et al. | 423/633 |
| 3,987,156 | 10/1976 | Nobuoka | 106/304 |
| 4,140,539 | 2/1979 | Hund et al. | 423/633 |

FOREIGN PATENT DOCUMENTS

53-28158  3/1978  Japan .
53-34827  3/1978  Japan .
53-102298 9/1978  Japan .

*Primary Examiner*—Mark Bell
*Attorney, Agent, or Firm*—George L. Rushton

[57] ABSTRACT

Yellow iron oxide pigments having improved heat stability are prepared by subjecting an alkaline slurry of conventional yellow iron oxide, a soluble ferric salt, sodium aluminate, and a third metal component, exemplified by antimony ion or a zinc ion/titanium ion combination, to a hydrothermal (autoclave) treatment at about 100°–240° C. The separated solid product has a heat stability temperature (based on the color change from yellow to red when heated) appreciably higher than that of the starting iron oxide.

9 Claims, 2 Drawing Figures

HEAT RESISTANT YELLOW IRON OXIDE PIGMENT

This is a continuation-in-part of our pending application Ser. No. 154,270, filed May 29, 1980, now abandoned.

BACKGROUND OF THE INVENTION

The present invention relates to a yellow iron oxide pigment having an inner particle structure containing AlOOH in the form of a solid solution, such as (Fe Al)OOH, the resultant pigment having a higher heat resistance than the conventional yellow iron oxide pigment used. The invention also relates to the process for the production of this heat stable yellow iron oxide pigment.

DESCRIPION OF THE PRIOR ART

Inorganic yellow pigments (other than yellow iron oxide), such as chrome yellow and cadmium yellow, and organic yellow pigments, such as benzidine yellow, are well known and are in practical use. For applications where heat resistance is required, pigments other than yellow iron oxide have been used. However, chrome yellow and cadmium yellow pigments contain ingredients harmful to the human body, and benzidine yellow exhibits a carcinogenic tendency. Therefore they are regulated for their production and use strictly by the Labor Security and Hygienic Law.

A pigment having improved heat resistance and being used as a substitute for these noxious yellow pigments should resolve many of the above disadvantages of the pigments now in use. In this regard, yellow iron oxide, which is commercially available, has indeed become useful in certain application fields. However, since yellow iron oxide has a disadvantage of a heat stability inferior to other yellow pigments, the range of its use as a substitute for the above-mentioned pigments is restricted. Thus, an improved yellow iron oxide pigment showing better heat resistance is desirable.

We have succeeded in preparing a new yellow iron oxide pigment containing AlOOH, such as (Fe Al)OOH, in the form of solid solution, which shows a heat resistance superior to the conventional yellow iron oxide pigment. This pigment is known in Japan (Patent Publication Laying Open No. 102298/1978). This AlOOH-containing yellow iron oxide pigment was obtained by introducing conventional yellow iron oxide into an aqueous solution of a ferric salt and adding thereto an alkali and an aluminum compound, followed by a hydrothermal treatment. This AlOOH-containing yellow iron oxide pigment shows a heat resistance which is about 50° C. higher than that of the untreated, conventional yellow iron oxide pigment. Therefore, it can be used as a substitute for yellow pigments in application fields where it is exposed to relatively low temperatures, such as for example, traffic paint and the like. However, it is not a complete substitute for the yellow pigments in applications requiring molding processing at higher temperatures, such as for compounding in polyethylene, polypropylene, ABS and so on, since the (Fe Al)OOH-containing iron oxide pigment can undergo a discoloration similar to that of the conventional yellow iron oxide pigment.

SUMMARY OF THE INVENTION

We have now found that the heat resistance will further be improved by adding one or more metal compounds as the third component of the solid solution of the (Fe Al)OOH-containing yellow iron oxide of our former invention.

According to the present invention, the heat stability of our improved yellow iron pigment is raised by about 80° C. as compared with conventional yellow iron oxide, so that it is now possible to employ yellow iron oxide pigment in applications requiring molding processing at higher temperature, such as for compounding in polyethylene, polypropylene, ABS and so on.

One aspect of the present invention is a process for the production of yellow iron oxide pigment with superior heat resistance containing AlOOH in the form of a solid solution, comprising:

(a) introducing conventional yellow iron oxide into an aqueous solution of a ferric salt, (b) adding thereto an aluminum compound and at least one other metal compound, together with alkali, and, (c) subjecting the mixture to a hydrothermal treatment, to form on the surface of a yellow iron oxide particle a layer containing (Fe Al)OOH and at least one other metal compound, in the form of a solid solution.

As the third component metal compound to be incorporated in the process according to the present invention, any metal compound capable of forming a solid solution with yellow iron oxide can be employed, especially those metal compounds having a valence of +3, such as antimony and bismuth, or those metal compounds in combination in which the average valence amounts to about +3, such as the combinations $Zn^{2+}+Sn^{4+}$, $Zn^{2+}+Ti^{4+}$, and $Na^{1+}+Nb^{5+}$, and thus falling under the condition expressed by $$2.5 < \Sigma X_1 \cdot V_1 < 3.5$$

in which $X_1$ denotes the mole fraction of each metal added as the third component and $V_1$ indicates the valence thereof. The valence of an element is the number of atomic weights of sodium, chlorine, or hydrogen that combine with 1 atomic weight of the element (from "Chemistry"-Quagliano; Prentiss-Hall, 1958).

While the AlOOH-containing yellow iron oxide which further contains the third component metal compound exhibits a heat resistance surpassing the AlOOH-containing yellow iron oxide pigment (prepared according to our former invention of Japanese Patent Laying Open No. 102298/1978), the heat resistance can further be increased when a yellow iron oxide, subjected previously to hydrothermal treatment in an aqueous solution of alkali at a temperature not higher than 250° C. (as disclosed in the Japanese Patent Publication No. 28158/1978 or in the Japanese Patent Laying Open No. 34827/1978), is employed in the process according to the present invention for the substrate yellow iron oxide. This pretreated starting substrate iron oxide already has an increased heat stability.

Another method of increasing the heat stability temperature of a conventional yellow iron oxide pigment is to form a slurry of yellow iron oxide, a soluble ferric salt, an alkali metal hydroxide, a soluble aluminum salt, and a third metal component, as described above. Then, this slurry is subjected to a first, "low temperature", hydrothermal treatment. The solid product from this treatment is separated from the liquid phase, and the solid phase is subjected to a second, "high temperature", hydrothermal treatment. It is important to note that after the first treatment the alkaline liquid phase is separated from the solid product, after the first treatment, before the second treatment is carried out.

DETAILED DESCRIPTION OF PREFERRED EMBODIMENTS

Figure 1:
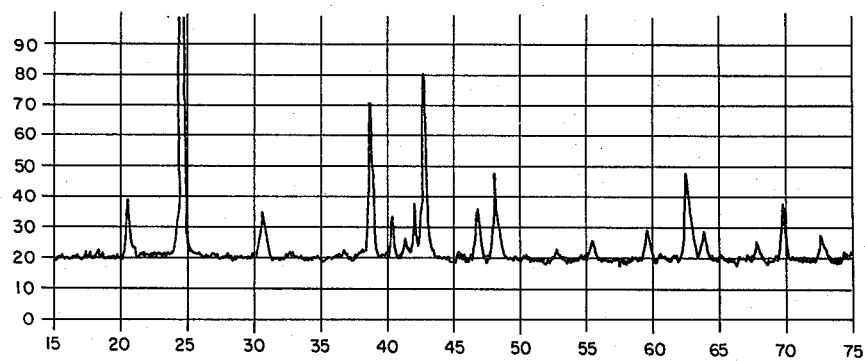
FIG. 1 is the X-ray diffraction pattern for the product of the invention, as shown in Example 1.

As mentioned above, the starting material for the preparation is a conventional yellow iron oxide pigment ($\alpha$-FeOOH). The soluble ferric salt added to the aqueous slurry of the iron oxide is exemplified by ferric sulfate, although other ferric salts that are soluble in water, such as ferric chloride, ferric nitrate, ferric oxalate, and ferric thiocyanate, can be used. An alkali metal hydroxide can be used to adjust the pH of the reacting mixture. Sodium hydroxide, a convenient and commercially-available alkali, is a preferred alkali metal hydroxide, although potassium hydroxide can be used. Since enough hydroxide ions are desired to keep the aluminum salt soluble, the carbonates of sodium and potassium can also be used. A soluble aluminum salt, such as the aluminum salt of an alkali metal hydroxide, exemplified by sodium aluminate, is conveniently prepared by mixing and dissolving aluminum oxide in sufficient sodium hydroxide. Potassium aluminate, aluminum chloride, and aluminum nitrate, are other examples of aluminum salts that are alkali- and water-soluble.

The amount of alkali metal hydroxide added can vary, depending on the other materials used. A solution of $Fe_2(SO_4)_3$ is quite acidic, so NaOH can be used to raise the pH to a value greater than 10, such as 12.5. The addition of sodium aluminate, itself an alkaline salt, reduces the amount of sodium hydroxide used.

Since the soluble aluminum compound furnishes the ion that forms a portion of the (FeAl)OOH contained in the iron oxide, the amount of soluble aluminum salt added is more than 20 wt.%, based on the amount of the soluble ferric salt added.

A soluble silicate compound can be added to the slurry, prior to the first hydrothermal treatment. Such soluble salts as sodium or potassium silicate can be used.

The hydrothermal treatments used in this preparation comprise heating the reactant mixture under autogenous pressure, using apparatus such as an autoclave. The temperature of the first treatment is in the range of from about 100° C. to about 240° C. Since the transition temperature of goethite (to hematite) is about 250° C., it is desirable that the temperature of the first treatment not exceed this transition temperature. The first treatment forms an AlOOH-containing iron oxide which appears to increase the stability of the yellow iron oxide pigment. Subsequent hydrothermal treatment, such as from about 250° C. to about 350° C., further improves the heat stability. The treatment periods for each hydrothermal treatment are not critical or precise, but experience has shown that a minimum time is at least 30 minutes, while a time of over 10 hours does not appear to increase the stability.

Although the pH of the slurry for the first hydrothermal treatment is quite alkaline (>10), it is a part of the invention that, after the first hydrothermal treatment the treated iron oxide be separated from the residual mother liquor. For example, a typical pH after a hydrothermal treatment was about 12.5. Following separation of the solid material, and washing of it, the pH was about 7. Upon re-slurrying of the solid, the pH rose to about 10. So the pH values vary during the process but are generally alkaline. The treated pigment is then dispersed in water and again subjected to a hydrothermal treatment, at a higher temperature. The product from this second treatment then has a heat stability temperature much higher than that of either the original conventional yellow iron oxide pigment used as starting material or the product of the first hydrothermal treatment.

The third metal component added in the preparation of this invention (in addition to the ferric oxide and ferric salt, and the aluminum salt) is a metal ion, or mixture of metal ions, having the characteristics of (a) being capable of forming a solid solution with yellow iron oxide and (b) having a valence of +3, or, wherein a combination of ions is used, having an average valence of +3, and wherein the expression $$2.5 < \Sigma X_1 \cdot V_1 < 3.5$$

is satisfied, in which $X_1$ = mole fraction of each metal ion added as the third component and $V_1$ = valence thereof. Ions such as $Sb^{+3}$, $Ga^{+3}$, $In^{+3}$, $Sc^{+3}$, $Y^{+3}$, and $Bi^{+3}$ are exemplary of a single ion satisfying the desired characteristics, while pairs of ions, such as $Zn^{+2}/Sn^{+4}$, $Zn^{+2}/Ti^{+4}$, $Na^+/Nb^{+5}$, $Mg^{+2}/Zr^{+4}$, $Li^+/Nb^{+5}$, and $K^+/Ta^{+5}$, exemplify mixtures of ions that operate in the invention.

Examples of compounds furnishing ions that can be used are: $SbCl_3$, $SbBr_3$, $SbOCl$, $Sb_2(SO_4)_3$, and $Sb_2O_3$; $GaCl_3$, $Ga(NO_3)_3 \cdot 8H_2O$, and $Ga_2O_3$; $InCl_3 \cdot xH_2O$, $In(NO_3)_3 \cdot xH_2O$, and $In_2(SO_4)_3 \cdot 9H_2O$; $ScCl_3$, $Sc_2(SO_4)_3 \cdot 6H_2O$, $Sc(NO_3)_3 \cdot 4H_2O$, $Sc_2(CO_3)_3 \cdot 12H_2O$, and $Sc(OH)CO_3 \cdot H_2O$; $YCl_3 \cdot 6H_2O$, $Y(NO_3)_3 \cdot 6H_2O$, $Y_2(SO_4)_3 \cdot 8H_2O$, $Y_2(CO_3)_3 \cdot 3H_2O$, and $Y(OH)_3$; $BiCl_3$, $BiF_3$, $Bi_2(SO_4)_3$, $Bi(NO_3)_3 \cdot 5H_2O$, $BiOCl$, $BiOBr$, $Bi(OH)SO_4$, $Bi(OH)(NO_3)_2$, $Bi(OH)CO_3$, and $Bi(OH)_3$; $SnCl_4 \cdot xH_2O$, $SnF_4$, $SnBF$, $Sn(SO_4)_2$, $Sn(NO_3)_4$, and $SnO_2 \cdot xH_2O$; $TiCl_4$, $TiI_4$, $Ti(SO_4)_2 \cdot xH_2O$, $TiOSO_4 \cdot 2H_2O$, $K_2TiF_6$, and $TiO_2 \cdot xH_2O$; $ZrBr_4$, $ZrF_4$, $ZrOCl_2 \cdot 8H_2O$, $Zr(NO_3)_4 \cdot 5H_2O$, $ZrOSO_4$, $ZrO(Ac)_2$, and $ZrO_2 \cdot xH_2O$; $NbCl_5$, $NbI_5$, $NbOF_3$, $NbOBr_3$, $NaNbF_6$, $K_2NbF_7$, $K_2NbOF_5$, $Na_3NbOF_6$, $Na_6NbOCl_5$, $NaNbO_3$, $K_2NbO_4$, and $Nb_2O_5 \cdot xH_2O$; $TaBr_5$, $TaF_5$, $NaTaF_6$, $K_2TaF_7$, $Na_3TaF_8$, and $Ta_2O_5 \cdot xH_2O$; $ZnCl_2$, $ZnSO_4 \cdot 7H_2O$, $Zn(NO_3)_2 \cdot 6H_2O$, $ZnI_2$, $Zn(BF_4)_2$, $Zn(CN)_2$, $Zn(SCN)_2$, $KZn(OH)_3$, $ZnCO_3$, $Zn_3(PO_4)_2 \cdot 4H_2O$, $ZnC_2O_4$, and $ZnO$; $MgCl_2 \cdot 6H_2O$, $MgSO_4 \cdot 6H_2O$, $Mg(NO_3)_2 \cdot 6H_2O$, $MgI_2 \cdot 8H_2O$, $Mg_3(PO_4)_2 \cdot 8H_2O$, $Mg(H_2PO_4)_2 \cdot 2H_2O$, $KMgH(CO_3)_2 \cdot 4H_2O$, $Mg(BF_4)_2$, $MgC_2O_4 \cdot 2H_2O$, and $Mg(OH)_2$; $LiOH$, $LiCl$, $LiNO_3$, $LiH_2PO_4$, $Li_2C_2O_4$, and $Li_3PO_4$; $KOH$, $K_2CO_3$, $K_2SO_4$, $KNO_3$, $KCl$, $KF$, $KCN$, $KSCN$, $KH_2PO_4$, $K_3PO_4$, $KHSO_4$, and $KOAc$; $NaOH$, $Na_2CO_3 \cdot 10H_2O$; $Na_2SO_4 \cdot 10H_2O$, $NaNO_3$, $NaCl$, $NaI$, $NaSCN$, $Na_2HPO_4 \cdot 12H_2O$, $NaHCO_3$, $NaOAC \cdot 3L\ H_2O$, $Na_2C_2O_4$, and $NaCN$. Those skilled in the art will realize that special steps may be needed to dissolve some of the above compounds. In case of hydrated compounds, the reacting weights are based on the anhydrous material.

In one aspect of the invention, the commercial yellow iron oxide can be pretreated in dilute alkaline solution. For example, 40 g of conventional yellow iron oxide were dispersed in 500 ml. of 1 N NaOH. This slurry was charged to a stainless steel autoclave and subjected to a hydrothermal treatment at 190° C. for 3 hours. The autoclave contents were removed and filtered, and the solid material was repeatedly washed with water until the electrical conductance of the filtrate was less than 100 µ℧/cm. This material was used as the pretreated starting material for further reaction.

The concentrations, weight relationships, and/or the volume relationships of the reactants of this invention can vary somewhat broadly, as shown.

Yellow iron oxide—from about 30 parts to about 200 parts, based on 1000 parts of water used in in the process.

Soluble ferric salt—from about 1 part to about 100 parts, based on 1000 parts of water. In another aspect, the soluble ferric salt is used from about 5 to about 30 wt. %, based on the yellow iron oxide pigment.

Third metal component—this component, based on a single iron or mixture of ions, is used in a range of less than 200 parts, preferably from about 20 to about 100 parts, based on 1000 parts of water. In another aspect, the third component is used in an amount of from about 10 to about 40 wt. %, based on the ferric salt used. The third metal component or components are typically added as aqueous solutions, as mentioned in the Examples.

Alkali metal aluminate (on a basis of $Al_2O_3$)—this is used at less than 200 parts, preferably from about 20 to about 100 parts, based on 1000 parts of water. In another aspect, the aluminate is used at more than 20 wt. %, based on the ferric salt.

In a pre-treatment such as that described above, the initial charge of iron oxide can be slurried in dilute NaOH in a range of from about 30 g to about 200 g per liter of NaOH solution, with the normality of the alkaline solution varying from about 0.5 N to about 3 N.

The invention is further explained below with reference to several Examples.

EXAMPLE 1

40 g of conventional commercial yellow iron oxide (Mapico Yellow-LL-XLO, Columbian Chemicals Co.) were dispersed in 500 ml of an aqueous solution of ferric sulfate having a concentration of 18 g/l, based on $Fe_2(SO_4)_3$. To this solution were added:

(a) 472 ml of an aqueous solution of sodium aluminate having a concentration of 45 g/l, calculated on the basis of $Al_2O_3$, (b) an aqueous solution prepared by dissolving 2 g of $Sb_2O_3$ in 73 ml of aqueous sodium aluminate of a concentration of 291 g/l, calculated on the basis of $Al_2O_3$, and (c) 10 ml of an aqueous solution of sodium silicate of a concentration of 20 g/l, calculated on the basis of $SiO_2$.

After agitation, the mixture was charged to a stainless steel autoclave to carry out a hydrothermal treatment at 200° C. for three hours. After this hydrothermal treatment, the contents of the autoclave were removed and subjected to water washing until the electric conductance of the filtrate reached a maximum value of 100/µ℧/cm. The filtered product was dried at 120° C. for 4 hours and then crushed in a sample mill to obtain a final product of Al/Sb-containing yellow iron oxide.

Using this product, a paint was formulated with the following composition:

| Yellow iron oxide | 8 g |
| --- | --- |
| Silicone resin SH-806A (a product of Toray Silicone, Inc.) | 24 g |
| Glass beads GB 503 (a product of Bridgestone Glassbeads Ltd.) | 40 g |

This mixture was shaken in a paint conditioner of Red Devil Co. for 20 minutes. The paint so obtained was coated on an aluminum plate (thickness of 0.1 mm) using a barcoater, and the coated panel was baked at various temperatures. Each panel baked was investigated using a Color and Color-Difference Meter (ND-101DC) of the firm Nihondenshoku K.K. The results were recorded by the terms of Hunter L, a, and b. The measurements for the panel baked at 150° C. were used as the standard for calculating the values of total color difference ($\Delta E = \sqrt{\Delta L^2 + \Delta a^2 + \Delta b^2}$) for each baking temperature. A small $\Delta E$ value corresponds to a lesser color change and, thus, to a better thermal stability.

Table I shows the data for Hunter L, a, and b as well as for $\Delta E$, in which:

(1) indicates data for the commercial yellow iron oxide, (2) = data for the AlOOH-containing yellow iron oxide obtained by the process according to Japanese Patent Laying Open No. 102298/1978, and (3) = data for the yellow iron oxide containing Al/Sb produced by the procedure of the invention as shown in Example 1.

TABLE I

| Pigment Used | Panel baked at 150° C., 30 min. | | | | Panel baked at 200° C., 15 min. | | | | Panel baked at 220° C., 15 min. | | | |
| --- | --- | --- | --- | --- | --- | --- | --- | --- | --- | --- | --- | --- |
| | L | a | b | ΔE | L | a | b | ΔE | L | a | b | ΔE |
| (1) | 51.5 | 6.3 | 30.2 | | 50.3 | 7.1 | 29.5 | 1.28 | 48.8 | 8.3 | 28.4 | 3.48 |
| (2) | 51.4 | 6.7 | 31.0 | | 51.3 | 6.7 | 30.9 | 0.14 | 51.2 | 6.7 | 30.7 | 0.35 |
| (3) | 49.8 | 6.4 | 29.7 | | 49.8 | 6.5 | 29.7 | 0.10 | 49.8 | 6.8 | 29.7 | 0.04 |

| Pigment Used | Panel baked at 240° C., 15 min. | | | | Panel baked at 260° C., 15 min. | | | | Panel baked at 280° C., 15 min. | | | |
| --- | --- | --- | --- | --- | --- | --- | --- | --- | --- | --- | --- | --- |
| | L | a | b | ΔE | L | a | b | ΔE | L | a | b | ΔE |
| (1) | 42.9 | 11.9 | 24.4 | 11.49 | 32.1 | 18.4 | 17.7 | 25.75 | 28.6 | 19.7 | 15.5 | 29.99 |
| (2) | 50.8 | 6.7 | 30.5 | 0.75 | 49.3 | 8.1 | 8.1 | 2.94 | 45.1 | 11.9 | 26.5 | 9.32 |
| (3) | 49.8 | 7.1 | 29.7 | 0.70 | 49.6 | 7.1 | 7.1 | 0.77 | 48.6 | 8.7 | 28.8 | 2.76 |

We arbitrarily decided that the heat stability of a pigment is represented by the temperature at which the color difference ($\Delta E$), with respect to the color at 150° C., reaches 1.5. From Table I, this heat resistance temperature was determined to be 203° C. for (1), the commercial yellow iron oxide; 250° C. for (2), the AlOOH-containing yellow iron oxide obtained by the process according to Japanese Patent Laying Open No. 102298/1978; and 270° C. for (3), the AlOOH-containing yellow iron oxide produced by the method of the invention as shown by Example 1. Thus, the AlOOH-containing yellow iron oxide produced by the procedure of Example 1 exhibits an improvement in the heat resistance temperature of 67° C. when compared with the conventional yellow iron oxide, and surpasses also the AlOOH-containing yellow iron oxide, obtained according to Japanese Patent Laying Open No. 102298/1978, by a magnitude of 20° C.

This corresponds to an improvement of heat resistance of 8° C. as compared with the AlOOH-containing yellow iron oxide obtained according to Japanese Patent Laying Open No. 102298/1978 (shown in Table I).

Figure 2:
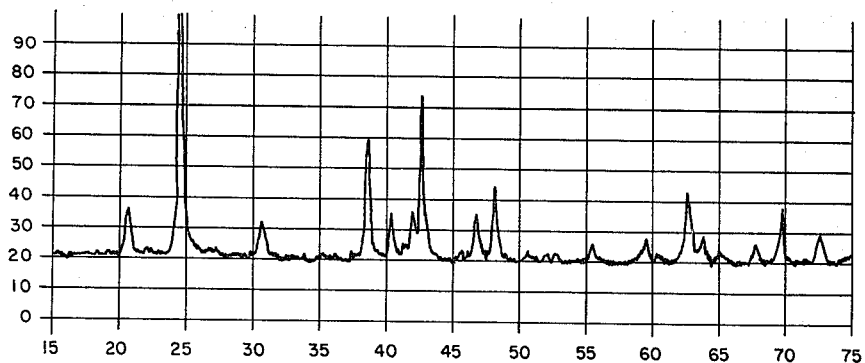
FIG. 2 is the X-ray diffraction pattern for the product of the invention, as shown in Example 2.

Analysis indicated that the yellow iron oxide treated by the procedure of Example 2 contained ZnO in an amount of 3.05% and $TiO_2$ in an amount of 1.54%, but showed no diffraction peak characteristic of oxides for a zinc-titanium system in the X-ray diffraction pattern. FIG. 2 is the x-ray diffraction pattern for the product of this Ex. 2.

TABLE II

| Panel baked at 105° C., 30 min. | | | | Panel baked at 200° C., 15 min. | | | | Panel baked at 220° C., 15 min. | | | |
| --- | --- | --- | --- | --- | --- | --- | --- | --- | --- | --- | --- |
| L | a | b | ΔE | L | a | b | ΔE | L | a | b | ΔE |
| 50.6 | 7.4 | 30.1 | | 50.4 | 7.4 | 30.1 | 0.20 | 50.3 | 7.1 | 30.0 | 0.44 |
| Panel baked at 240° C., 15 min. | | | | Panel baked at 260° C., 15 min. | | | | Panel baked at 280° C., 15 min. | | | |
| L | a | b | ΔE | L | a | b | ΔE | L | a | b | ΔE |
| 50.1 | 7.4 | 29.8 | 0.63 | 49.3 | 7.9 | 29.2 | 1.67 | 46.8 | 10.0 | 27.3 | 5.41 |

Because of the fact that no diffraction peak characteristic for antimony oxide was noted in the X-ray diffraction pattern of the yellow iron oxide treated by the procedure of Example 1 (FIG. 1), the reason for the improvement in the heat resistance indicated above may be due to the formation of a skin layer, in which Sb-based AlOOH is contained in form of a solid solution in the crystal of yellow iron oxide and which shows therefore a heat stability superior to that of the layer of yellow iron oxide containing only AlOOH in the form of a solid solution, as in Sample 2. Chemical analysis shows that the AlOOH-containing yellow iron oxide produced by the procedure of Example 1 (Sample 3) contained 1.06% $Sb_2O_3$.

EXAMPLE 2

40 g of commercial yellow iron oxide, as in Ex. 1, were dispersed in 500 ml of an aqueous solution of ferric sulfate having a concentration of 18 g/l, calculated on the basis of $Fe_2(SO_4)_3$. To this dispersion were added:

(a) 146 ml of an aqueous solution of sodium aluminate at a concentration of 291 g/l, based on $Al_2O_3$, (b) 400 ml of an aqueous solution containing 3.57 g of $ZnSO_4.7H_2O$ and 2.43 g of $TiOSO_4.2H_2O$, and (c) 10 ml of aqueous solution of sodium silicate (concentration of 20 g/l, based on $SiO_2$).

The agitated mixture was charged to a stainless steel autoclave to carry out a hydrothermal treatment at 200° C. for 3 hours. The product was then treated by washing, drying, and crushing, as in Example 1. The AlOOH-containing yellow iron oxide product obtained was examined for its heat resistance in the same manner as in Example 1. The results obtained are given in Table II, from which it is noted that the heat resistance temperature at which ΔE amounts to 1.5 lies at 258° C.

EXAMPLE 3

40 g of commercial yellow iron oxide (as in Ex. 1) were dispersed in 500 ml of an aqueous solution of ferric sulfate at a concentration of 18 g/l, calculated on the basis of $Fe_2(SO_4)_3$. To this dispersion, there were added:

(a) 455 ml of an aqueous solution of sodium aluminate at a concentration of 110 g/l, as calculated on the basis of $Al_2O_3$, (b) 2.48 g of $ZnSO_4.7H_2O$, (c) 2.30 g of $Na_2SnO_3.3H_2O$, and (d) 10 ml of an aqueous solution of sodium silicate at a concentration of 20 g/l, calculated on the basis of $SiO_2$.

After agitation, the mixture was charged to an autoclave made of stainless steel to carry out a hydrothermal treatment at 200° C. for 3 hours. The product was then treated by washing, drying, and crushing, as in Example 1. The AlOOH-containing yellow iron oxide obtained was examined for its heat resistance in the same manner as in Example 1.

The results obtained are as given in Table III, from which it is shown that the heat resistance temperature at which ΔE amounts to 1.5 lies at 260° C., indicating an improvement of heat resistance of 10° C. as compared with the AlOOH-containing yellow iron oxide obtained according to Japanese Patent Laying Open No. 102298/1978 shown in Table I.

Analysis confirmed that the yellow iron oxide treated by the procedure of Example 3 contained ZnO in an amount of 1.46% and $SnO_2$ in an amount of 1.88% but showed no diffraction peak for the oxide of zinc/tin in the X-ray diffraction pattern.

TABLE III

| Panel baked at 150° C., 30 min. | | | | Panel baked at 200° C., 15 min. | | | | Panel baked at 220° C., 15 min. | | | |
| --- | --- | --- | --- | --- | --- | --- | --- | --- | --- | --- | --- |
| L | a | b | ΔE | L | a | b | ΔE | L | a | b | ΔE |
| 49.6 | 7.1 | 29.6 | | 59.5 | 7.1 | 29.5 | 0.14 | 49.4 | 7.2 | 29.4 | 0.26 |
| Panel baked at 240° C., 15 min. | | | | Panel baked at 260° C., 15 min. | | | | Panel baked at 280° C., 15 min. | | | |
| L | a | b | ΔE | L | a | b | ΔE | L | a | b | ΔE |
| 49.1 | 7.5 | 29.2 | 0.75 | 48.5 | 7.6 | 28.7 | 1.50 | 47.0 | 9.2 | 27.6 | 3.88 |

EXAMPLE 4

The procedure of Example 1 was followed except that a pretreated yellow iron oxide, obtained by subjecting conventional yellow iron oxide to a hydrothermal treatment at 190° C. for 3 hours in 1 N aqueous NaOH solution, was employed for the starting yellow iron oxide substrate.

The results of the evaluation of heat resistance of the AlOOH-containing yellow iron oxide product are given in Table IV, from which it is shown that the heat resistance temperature at which ΔE reaches the value of 1.5 lies at 280° C., corresponding to an improvement of heat resistance of 10° C. compared with that of Sample 3 of Example 1.

TABLE V

| Pigment Used | Panel baked at 150° C., 30 min. | | | | Panel baked at 260° C., 15 min. | | | | Panel baked at 280° C., 15 min. | | | |
|---|---|---|---|---|---|---|---|---|---|---|---|---|
| | L | a | b | ΔE | L | a | b | ΔE | L | a | b | ΔE |
| SbOOH/AlOOH treatmt. 200° C. 3 hrs. | 49.8 | 6.4 | 29.7 | | 49.6 | 7.1 | 29.6 | 0.77 | 48.6 | 8.7 | 28.8 | 2.76 |
| SbOOH/AlOOH; according to invention | 49.8 | 7.1 | 29.7 | | 49.5 | 7.1 | 29.5 | 0.39 | 49.4 | 7.5 | 29.4 | 0.64 |

| Pigment Used | Panel baked at 290° C., 15 min. | | | | Panel baked at 300° C., 15 min. | | | | Panel baked at 310° C., 15 min. | | | |
|---|---|---|---|---|---|---|---|---|---|---|---|---|
| | L | a | b | ΔE | L | a | b | ΔE | L | a | b | ΔE |
| SbOOH/AlOOH treatmt. 200° C. 3 hrs. | 44.6 | 12.4 | 26.5 | 8.56 | 35.4 | 17.9 | 20.0 | 20.82 | 28.8 | 20.8 | 15.7 | 29.06 |
| SbOOH/AlOOH; according to invention | 49.0 | 7.2 | 29.2 | 0.96 | 49.0 | 7.5 | 29.2 | 1.05 | 47.6 | 9.9 | 28.1 | 3.90 |

TABLE IV

| Panel baked at 150° C., 30 min. | | | | Panel baked at 200° C., 15 min. | | | | Panel baked at 220° C., 15 min. | | | |
|---|---|---|---|---|---|---|---|---|---|---|---|
| L | a | b | ΔE | L | a | b | ΔE | L | a | b | ΔE |
| 51.0 | 6.0 | 30.8 | | 51.0 | 6.2 | 30.7 | 0.22 | 50.9 | 6.2 | 30.7 | 0.25 |

| Panel baked at 240° C., 15 min. | | | | Panel baked at 260° C., 15 min. | | | | Panel baked at 280° C., 15 min. | | | |
|---|---|---|---|---|---|---|---|---|---|---|---|
| L | a | b | ΔE | L | a | b | ΔE | L | a | b | ΔE |
| 50.8 | 6.2 | 30.5 | 0.41 | 50.2 | 6.4 | 30.3 | 1.03 | 49.8 | 6.4 | 30.1 | 1.46 |

EXAMPLE 5

The procedure of Example 1 was repeated, through the hydrothermal treatment at 200° C. for three hours. Then, the contents of the autoclave were removed, and the treated iron oxide was separated from the alkaline mother liquor. The solid phase was dispersed in water, and the dispersion was charged to an autoclave, where it was subjected to a further hydrothermal treatment at 290° C. for 5 hours. The Al- and Sb-containing iron oxide product was filtered, washed, dried, crushed, and tested for its heat stability temperature, as in Example 1. The results obtained are given in Table V, from which it is noted that the heat stability temperature (where ΔE=1.5) is 303° C. A comparison of the heat stability temperature of the materials of Example 1 and Example 5 shows the following:

| SAMPLE | STABILITY TEMP. (°C.) |
|---|---|
| (1) Conventional yellow iron oxide | 203 |
| (2) Yellow iron oxide, as a product of Example 1 | 270 |
| (3) Yellow iron oxide, as a product of Example 5 | 303 |

Thus, the heat stability temperature of the product of Example 5 shows an improvement of 100° C. over that of the starting yellow iron oxide and an improvement of 33° C. over the Sb- and Al-containing product of the hydrothermal treatment of Example 1.

COMPARISON EXAMPLE 5

The procedure of Example 5 was repeated, through the step of the hydrothermal treatment at 200° C. for three hours. Then, without removal of the mother liquor and redispersal, the contents of the autoclave were subjected to a second hydrothermal treatment at 290° C. for 1 hour. The product obtained consisted of red-colored α-iron oxide.

This example shows the importance of removing the alkaline mother liquor before the second, higher-temperature hydrothermal treatment is started.

The embodiments of the invention in which an exclusive property or privilege is claimed are defined as follows:

1. A method of preparing a yellow iron oxide pigment having improved heat stability, comprising
   (a) forming an aqueous slurry of from about 30 to about 200 parts of yellow iron oxide (α-FeOOH), from about 1 to about 100 parts of a soluble ferric salt selected from the group consisting of ferric sulfate, ferric chloride, ferric nitrate, ferric oxalate and ferric thiocyanate, an amount of an alkali metal hydroxide to provide the slurry with a pH of greater than 10, and from about 20 to about 100 parts of a water-soluble or alkali-soluble aluminum salt selected from the group consisting of sodium aluminate, potassium aluminate, aluminum chloride, and aluminum nitrate,
   (b) adding to the above slurry from about 20 to about 100 parts as a third metallic component, a metal ion or ions having the characteristics of
       (1) being capable of forming a solid solution with yellow iron oxide and (2) having a valence of +3, or wherein a combination of ions is used having an average valence of +3, and wherein the expression $$2.5 < \Sigma X_1 \cdot V_1 < 3.5$$

is satisfied, in which $X_1$=mole fraction of each metal ion added as the third component and $V_1$=valence thereof, the parts (a) and (b) being based on 1000 parts of water, (c) subjecting the resultant mixture to hydrothermal treatment carried out at a temperature of from about 100° C. to about 240° C., for a time greater than 30 minutes, to form, on the surface of the iron oxide particle, a layer comprising (Fe Al)OOH and at least one other metal compound, in the form of a solid solution, (d) separating the treated mixture into a solid phase and a liquid phase, and (e) recovering the solid phase.

2. The method of claim 1, wherein (a) The soluble ferric salt is ferric sulfate, (b) the alkali metal hydroxide is sodium hydroxide, (c) the soluble aluminum salt is an alkali metal aluminate, (d) the third metallic component is selected from the group of ions consisting of antimony, bismuth, and a combination of ions having an average valence of +3, and (e) from about 0.3-5.0 wt.%, based on the aluminum of the soluble aluminum salt of a soluble silicate of an alkali metal hydroxide is added to the mixture prior to the hydrothermal treatment.

3. The method of claim 2, wherein (a) the amount of soluble aluminate added is more than 20 wt.%, based on the soluble ferric salt, (b) the third metallic component, added as a single compound, is a compound of antimony or bismuth, (c) the third metallic component, added as a combination of ions having an average valence of +3, is selected from the pairs consisting of $Zn^{+2}/Sn^{+4}$, $Zn^{+2}/Ti^{+4}$, $Na^{+}/Nb^{+5}$, $Mg^{+2}/Zr^{+4}$, $Li^{+}/Nb^{+5}$, and $K^{+}/Ta^{+5}$, (d) the time of the hydrothermal treatment varies from ½ to about 4 hours, and (e) the solid phase from the hydrothermal treatment is water-washed until the electric conductance of the filtrate has a value of not more than 100 μ ʊ/cm.

4. A method of preparing a yellow iron oxide pigment having improved heat stability, comprising (a) forming a first aqueous slurry of from about 30 to about 200 grams of yellow iron oxide per liter of a dilute aqueous alkaline solution, (b) subjecting the slurry to a first hydrothermal treatment carried out at a temperature of from about 100° C. to about 240° C., for a time greater than 30 minutes, (c) separating the resultant solid phase from the liquid phase, (d) forming a second aqueous slurry of from about 30 to about 200 parts of the treated yellow iron oxide of step (c), from about 1 to about 100 parts of a soluble ferric salt selected from the group consisting of ferric sulfate, ferric chloride, ferric nitrate, ferric oxalate and ferric thiocyanate, an amount of alkali metal hydroxide to provide the slurry with a pH of greater than 10, and from about 20 to about 100 parts of a water-soluble or alkali-soluble aluminum salt selected from the group consisting of sodium aluminate, potassium aluminate, aluminum chloride and aluminum nitrate, (e) adding to the above slurry from about 20 to about 100 parts as a third metallic component, a metal ion or ions having the characteristics of (1) being capable of forming a solid solution with yellow iron oxide and (2) having a valence of +3, or wherein a combination of ions is used, having an average valence of +3, and wherein the expression $$2.5 < \Sigma X_1 \cdot V_1 < 3.5$$

is satisfied, in which $X_1$=mole fraction of each metal ion added as the third component and $V_1$=valence thereof, the parts of (d) and (e) being based on 1000 parts of water, (f) subjecting the resultant mixture to a second hydrothermal treatment carried out at a temperature of from about 100° C. to about 240° C., for a time greater than 30 minutes, to form, on the surface of the iron oxide particle, a layer comprising (Fe Al)OOH and at least one other metal compound, in the form of a solid solution, (g) separating the treated mixture into a solid phase and a liquid phase, and (h) recovering the solid phase.

5. The method of claim 4, wherein (a) the slurry of step 4(a) wherein the dilute alkaline solution is a dilute alkali metal hydroxide solution, the normality of the hydroxide solution being between about 0.5 and 3 N, (b) the soluble ferric salt is ferric sulfate, (c) the alkali metal hydroxide is sodium hydroxide, (d) the soluble aluminum salt is an alkali metal aluminate, (e) the third metallic component is selected from the ion group consisting of antimony, gallium, indium, scandium, yttrium, and bismuth, and a combination of ions having an average valence of +3, and (f) from about 0.3-5.0 wt.%, based on the aluminum of the soluble aluminum salt of a soluble silicate of an alkali metal hydroxide is added to the mixture prior to the second hydrothermal treatment.

6. The method of claim 5, wherein (a) the amount of soluble aluminate added is more than 20 wt.%, based on the soluble ferric salt, (b) the third metallic component, added as a single compound, is a compound of antimony or bismuth, (c) the third metallic component, added as a combination of ions having an average valance of +3, is selected from the pairs consisting of $Zn^{+2}/Sn^{+4}$, $Zn^{+2}/Ti^{+4}$, $Na^{+}/Nb^{+5}$, $Mg^{+2}/Zr^{+4}$, $Li^{+}/Nb^{+5}$, and $K^{+}/Ta^{+5}$, (d) the time of the first hydrothermal treatment varies from ½ to about 4 hours, (e) the time of the second treatment varies from about ½ to about 4 hours, and (f) the alkaline solution of the first slurry is a sodium hydroxide solution of about 1 N concentration.

7. A method of preparing a yellow iron oxide pigment having improved heat stability, comprising (a) forming a aqueous slurry of from about 30 to about 200 parts of yellow iron oxide ($\alpha$-FeOOH), from about 1 to about 100 parts of a soluble ferric salt selected from the group consisting of ferric sulfate, ferric chloride, ferric nitrate, ferric oxalate and ferric thiocyanate, an amount of an alkali metal hydroxide to provide the slurry with a pH of greater than 10, and from about 20 to about 100 parts of a water-soluble or alkali-soluble aluminum salt selected from the group consisting of sodium aluminate, potassium aluminate, aluminum chloride, and aluminum nitrate, (b) adding to the above slurry from about 20 to about 100 parts as a third metallic component, a metal ion or ions having the characteristics of
  (1) being capable of forming a solid solution with yellow iron oxide and
  (2) having a valence of +3, or wherein a combination of ions is used, having an average valence of +3, and wherein the expression $$2.5 < \Sigma X_1 \cdot V_1 < 3.5$$

is satisfied, in which $X_1$=mole fraction of each metal ion added as the third component and $V_1$=valence thereof, the parts of (a) and (b) being based on 1000 parts of water, (c) subjecting the resultant mixture to a first hydrothermal treatment carried out at a temperature of from about 100° C. to about 240° C., for a time greater than 30 minutes, to form, on the surface of the iron oxide particle, a layer comprising (Fe Al)OOH and at least one other metal compound, in the form of a solid solution, (d) separating the treated mixture into a solid phase and a liquid phase, (e) forming an aqueous slurry of the solid phase, (f) subjecting the slurry to a second hydrothermal treatment carried out a temperature of from about 250° C. to about 350° C., for a time period greater than 30 minutes, at a temperature higher that that of the first treatment, (g) separating the treated mixture into a second solid phase and a second liquid phase, and (h) recovering the second solid phase.

8. The method of claim 7, wherein
(a) The soluble ferric salt is ferric sulfate,
(b) the alkali metal hydroxide is sodium hydroxide,
(c) the soluble aluminum salt is an alkali metal aluminate,
(d) the third metallic component is selected from the group consisting of antimony, gallium, indium, scandium, yttrium, and bismuth, and a combination of ions having an average valence of +3, and
(e) from about 0.3–5.0 wt. %, based on the aluminum of the soluble aluminum salt of a soluble silicate of an alkali metal hydroxide is added to the mixture prior to the hydrothermal treatment.

9. The method of claim 8, wherein
(a) the third metallic component, added as a single compound, is a compound of antimony or bismuth,
(b) the third metallic component, added as a combination of ions having an average valence of +3, is selected from the pairs consisting of $Zn^{+2}/Sn^{+4}$, $Zn^{+2}/Ti^{+4}$, $Na^+/Nb^{+5}$, $Mg^{+2}/Zr^{+4}$, $Li^+/Nb^{+5}$, and $K^+/Ta^{+5}$,
(c) the time of the first hydrothermal treatment varies from ½ to about 4 hours, and
(d) the time of the second treatment varies from about ½ to about 10 hours.

* * * * *